US010541913B2

(12) United States Patent
Lin et al.

(10) Patent No.: US 10,541,913 B2
(45) Date of Patent: Jan. 21, 2020

(54) TABLE ENTRY IN SOFTWARE DEFINED NETWORK

(71) Applicant: Hewlett Packard Enterprise Development LP, Houston, TX (US)

(72) Inventors: Tao Lin, Beijing (CN); Tao Wen, Beijing (CN); Weichun Ren, Beijing (CN); Yinfei Zhang, Beijing (CN); Xilong Zhang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 315 days.

(21) Appl. No.: 15/518,186

(22) PCT Filed: Oct. 10, 2015

(86) PCT No.: PCT/CN2015/091610
§ 371 (c)(1),
(2) Date: Apr. 10, 2017

(87) PCT Pub. No.: WO2016/055027
PCT Pub. Date: Apr. 14, 2016

(65) Prior Publication Data
US 2017/0310586 A1 Oct. 26, 2017

(30) Foreign Application Priority Data

Oct. 10, 2014 (CN) .......................... 2014 1 0529102

(51) Int. Cl.
*H04L 12/741* (2013.01)
*H04L 12/64* (2006.01)
(Continued)

(52) U.S. Cl.
CPC .......... *H04L 45/54* (2013.01); *H04L 12/6418* (2013.01); *H04L 45/56* (2013.01); *H04L 45/30* (2013.01); *H04L 69/22* (2013.01)

(58) Field of Classification Search
CPC ......... H04L 45/54; H04L 45/56; H04L 45/30; H04L 12/6418; H04L 69/22
See application file for complete search history.

(56) References Cited

U.S. PATENT DOCUMENTS

2010/0107162 A1* 4/2010 Edwards ............... G06F 9/5077
718/1
2013/0266015 A1* 10/2013 Qu .......................... H04L 45/74
370/392
(Continued)

FOREIGN PATENT DOCUMENTS

CN 103023827 A 4/2013
CN 103229489 A 7/2013
(Continued)

OTHER PUBLICATIONS

International Search Report and Written Opinion dated Jan. 22, 2016, PCT Patent Application No. PCT/CN2015/091610 dated Oct. 10, 2015, 10 pages.
(Continued)

*Primary Examiner* — Austin J Moreau
(74) *Attorney, Agent, or Firm* — Hewlett Packard Enterprise Patent Department

(57) ABSTRACT

A forwarding flow table request sent by a host device when the host device fails to find a matching forwarding flow table entry for a data packet to be forwarded is received, when a destination MAC address of the data packet is the global virtual MAC address, a forwarding flow table entry is generated according to the global port table; the forwarding flow table entry includes an operation indication of replacing the destination MAC address of the data packet with the matching MAC address found in the global port table; and the forwarding flow table entry is sent to the host device, so that the host device may forward a data packet matching the forwarding flow table entry.

11 Claims, 5 Drawing Sheets

(51) Int. Cl.
*H04L 12/771* (2013.01)
*H04L 12/725* (2013.01)
*H04L 29/06* (2006.01)

(56) References Cited

U.S. PATENT DOCUMENTS

2013/0266019 A1  10/2013  Qu et al.
2016/0134534 A1*  5/2016  Tan .................. H04L 45/02
                                                370/392

FOREIGN PATENT DOCUMENTS

| CN | 103841028 | 6/2014 |
| CN | 103905317 A | 7/2014 |
| CN | 103905523 | 7/2014 |

OTHER PUBLICATIONS

Mahalingam, M. et al., "Virtual eXtensible Local Area Network (VXLAN): A Framework for Overlaying Virtualized Layer 2 Networks over Layer 3 Networks", RFC 7348, Aug. 31, 2014, ISSN: 2070-1721, 22 pgs.

Qiang, Zu, et al., "Problem Statement for VxLAN Performance Test", Network Working Group Internet Draft, Jul. 3, 2014, 12 pages.

\* cited by examiner

TABLE ENTRY IN SOFTWARE DEFINED NETWORK

BACKGROUND

A general framework of an overlay network is to implement an application carried on the network and to separate from other network traffic without large-scale modification of the infrastructure network; besides the overlay network is mainly an IP-based infrastructure network technology. The basic principle of the overlay technology is enabling the virtual machines to communicate in a tunnel through a tunnel encapsulation technology.

The Software Defined Network (SDN) technology is novel network communication architecture. The SDN technology realizes collective control and distributive forwarding of network devices. In the concept of the SDN technology, the network function is divided into two parts: controlling device and data channel, which interact therebetween through a secure channel. The controlling device may perform a collective management of the network devices under its control, uniformly arrange the network behaviors, and then prescribe the forwarding behaviors of data paths. The SDN technology greatly enhances the controllability and flexibility of network management.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Figure 1:
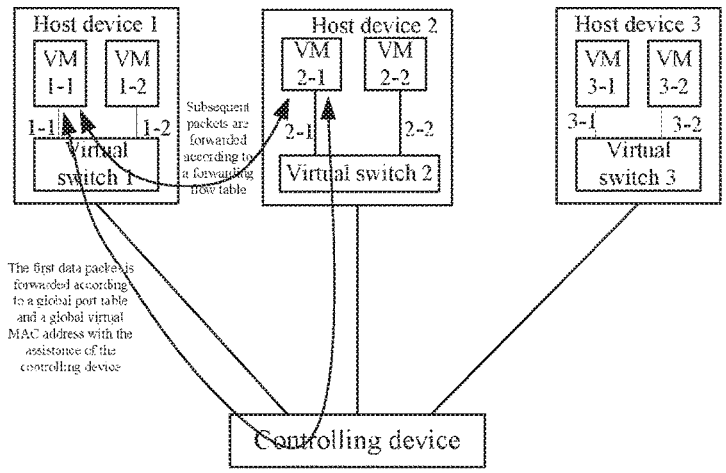
FIG. 1 is a schematic diagram illustrating the SDN according to an example of the present disclosure.

In the virtual network constructed using Virtual eXtensible Local Area Network (VXLAN) in the overlay technology, there is also a need for interworking between VXLANs; similar to the inter-VLAN forwarding, an independent Router device, i.e., VXLAN layer-3gateway, is also needed. However, in the cloud computing environment, after virtual switches are deployed on a great number of hosts, if all inter-Virtual Machine (VM) traffic goes through the VXLAN gateway, the VXLAN gateway will become a forwarding bottleneck.

In view of above, the present disclosure provides a packet processing method in a SDN. In the method, the controlling device performs reply on behalf to the ARP request packet, and sends a forwarding flow table entry for forwarding a data packet, so as to satisfy the requirement for interworking between VXLANs, namely the controlling device is disguised into a virtual gateway device. In the SDN of the present disclosure, the interworking between VXLANs may be achieved without a VXLAN gateway device.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

In an example, a controlling device configures a global virtual Media Access Control (MAC) address, and takes the global virtual MAC address as a MAC address of a virtual gateway device, namely, takes the global virtual MAC address as a virtual gateway MAC address to reply to the ARP request packets sent from VMs in each host device, that is to say, the virtual gateway device has not an actual MAC address, when the controlling device replies to a VM with the global virtual MAC address, the VM may get a response to the ARP request packet which it sent, and then establish a local ARP table entry. Subsequently, when the VM sends a packet to be forwarded to another VXLAN, the destination IP address of the packet is the IP address of the destination VM of the another VXLAN, and the destination MAC address of the packet is the global virtual MAC address replied by the controlling device. When there is not a forwarding flow table entry corresponding to the packet on the host device where the VM is located, the host device will send the packet to the controlling device (for example, send the packet to the controlling device through a Packet-in message of the OpenFlow protocol), and the controlling device may search the global port information, such as a global port table, stored in the controlling device for port information of the destination VM according to the destination IP address of the packet, and obtain the actual MAC address of the destination VM, subsequently, the controlling device may instruct the host device to replace the global MAC address of the packet with the actual MAC address of the destination VM through a forwarding flow table entry. Thus the packet forwarding between VXLANs may be achieved when there is not a VXLAN gateway device which is similar to a gateway device required by inter-VLAN forwarding.

In an example, the global virtual MAC address may be used to reply to an ARP request packet when the ARP request packet is received. In another example, the global virtual MAC address may be used to reply to an ARP request packet only when the ARP request packet is forwarded between different VXLANs, and an actual MAC address of a destination device is used to reply to an ARP request packet when the ARP request packet is forwarded within the same VXLAN.

When performing reply on behalf to the ARP request packet and sending the forwarding flow table entry, the controlling device needs to look up a global port information table in the controlling device, to judge the source IP address and source MAC address of the ARP request packet. A generation process of the global port information table will be described hereinafter with reference to an accompanying drawing.

FIG. 1 is a schematic diagram illustrating the SDN according to an example of the present disclosure. As shown in FIG. 1, the controlling device may configure three subnets, which are respectively denoted by 1, 2 and 3. The controlling device configures a global port number 1 and a global port number 2 for subnet 1, configures a global port number 3 and a global port number 4 for subnet 2, and configures a global port number 5 and a global port number 6 for subnet 3. In FIG. 1, VM1-1, VM1-2 and virtual switch 1 may run on host device 1, VM2-1, VM2-2 and virtual switch 2 may run on host device 2, VM3-1, VM3-2 and virtual switch 3 may run on host device 3.

The controlling device may manually configure a corresponding relationship between a virtual machine (VM) and a global port number, or the controlling device may obtain a newly created corresponding relationship between a VM and a global port number through a VM management platform. In an example, the corresponding relationship between a VM and a global port number may be a corresponding relationship between a MAC address of a VM and a global port number. In another example, the corresponding relationship between a VM and a global port number may be a port connecting a VM to a virtual switch and a global port number. The corresponding relationship between a VM and a global port number is not limited in the present disclosure.

It is taken as an example that a corresponding relationship between a MAC address of a VM and a global port number is manually configured, suppose that MAC1-1 of VM1-1 corresponds to the global port number 1, MAC1-2 of VM1-2 corresponds to the global port number 2, MAC2-1 of VM2-1 corresponds to the global port number 3, MAC2-2 of VM2-2 corresponds to the global port number 4, MAC3-1 of VM3-1 corresponds to the global port number 5, and MAC3-2 of VM3-2 corresponds to the global port number 6.

In FIG. 1, VM1-1, VM1-2, VM2-1 and VM3-1 being online for the first time is taken as an example, the virtual switch 1 detects that VM1-1 is online, and reports information (Internet Protocol (IP)1-1, MAC1-1, port1-1 and tunnel IPT1) of port 1-1 to the controlling device. The virtual switch 1 detects that VM1-2 is online, and reports information (IP1-2, MAC1-2, port1-2 and tunnel IPT1) of port 1-2 to the controlling device. The virtual switch 2 detects that VM2-1 is online, and reports information (IP2-1, MAC2-1, port2-1 and tunnel IPT2) of port 2-1 to the controlling device. The virtual switch 3 detects that VM3-1 is online, and reports information (IP3-1, MAC3-1, port3-1 and tunnel IPT3) of port 3-1 to the controlling device.

When receiving the port information reported by each virtual switch, the controlling device generates a global port table entry in a global port table according to the corresponding relationship between a VM and a global port number. Referring to table 1, table 1 illustrates content included in the global port table.

TABLE 1

| IP address | MAC address | Port number | Subnet identifier | Tunnel IP address |
|---|---|---|---|---|
| IP1-1 | MAC1-1 | 1-1 | 1 | IPT1 |
| IP1-2 | MAC1-2 | 1-2 | 1 | IPT1 |
| IP2-1 | MAC2-1 | 2-1 | 2 | IPT2 |
| IP3-1 | MAC3-1 | 3-1 | 3 | IPT3 |

Since MAC1-1 corresponds to the global port number 1, MAC1-1 corresponds to subnet identifier 1. The obtaining method of corresponding relationship between other MAC addresses and subnet identifiers is similar to that of MAC1-1 and subnet identifier 1, and no further descriptions will be given here. The global port table may further include a global port number, a host identifier, a VXLAN identifier corresponding to the subnet identifier, and so on. The global port table generated in the present disclosure may at least include the content included in table 1.

Above mentioned description is about a generating method of a global port table corresponding to one virtual router when there is logic implementation of the one virtual router on the controlling device. The virtual router is a virtual device used to forward traffic between VXLANs. In an example, the controlling device may expand to implement multiple virtual routers and take the multiple virtual routers as VXLAN gateways. For each virtual router, the generating method of a corresponding global port table is similar to that mentioned above. When searching a global port table, the controlling device may determine a virtual router to which a packet belongs to according to the source information (source IP address and source MAC address) of the packet, and search the global port table corresponding to the determined virtual router.

A process of processing an ARP request packet and a data packet by the controlling device in an example will be described detailed below in conjunction with the following drawings.

Figure 2:
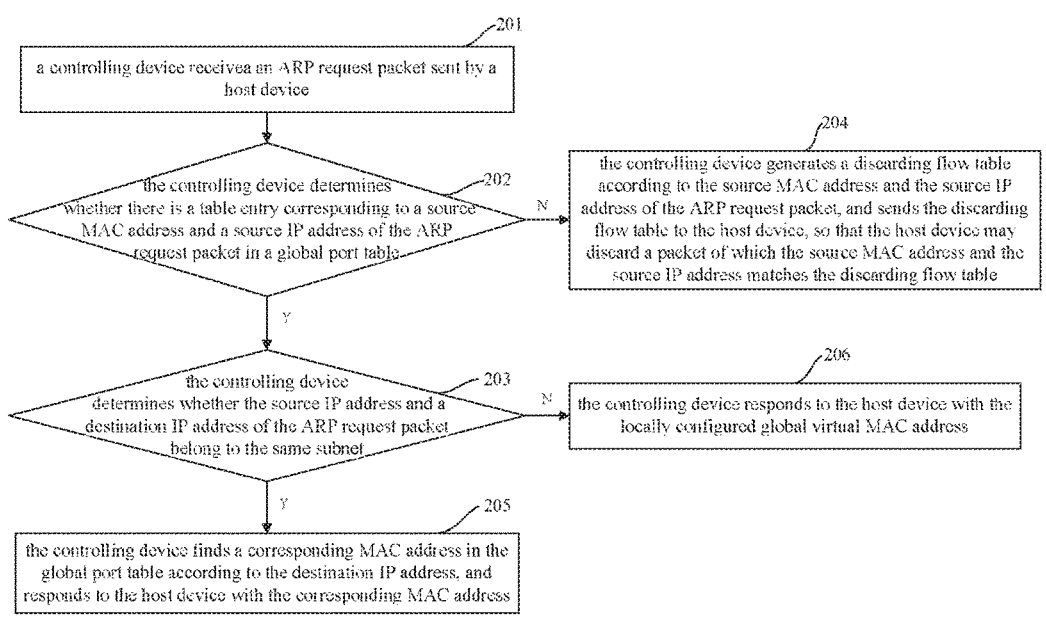
FIG. 2 is a flow diagram illustrating a method for processing an Address Resolution Protocol (ARP) request packet according to an example of the present disclosure.

FIG. 2 is a flow diagram illustrating a method for processing an Address Resolution Protocol (ARP) request packet according to an example of the present disclosure. As shown in FIG. 2, the method may include the following processes.

At block 201, a controlling device may receive an ARP request packet sent by a host device.

At block 202, the controlling device may determine whether there is a table entry corresponding to a source MAC address and a source IP address of the ARP request packet in a global port table, when there is a corresponding table entry in the global port table, block 203 may be performed; otherwise, block 204 may be performed.

At block 203, the controlling device may determine whether the source IP address and a destination IP address of the ARP request packet belong to the same subnet, when the source IP address and the destination IP address of the ARP request packet belong to the same subnet, block 205 may be performed; otherwise, block 206 may be performed.

The controlling device searches the global port table for an subnet identifier matching the source IP address of the ARP request packet and an subnet identifier matching the destination IP address of the ARP request packet, if the subnet identifier matching the source IP address is the same as the subnet identifier matching the destination IP address, the controlling device determines that the source IP address and the destination IP address of the ARP request packet belongs to the same subnet; otherwise, the controlling device determines that the source IP address and the destination IP address of the ARP request packet do not belong to the same subnet.

At block 204, the controlling device may generate a discarding flow table entry according to the source MAC address and the source IP address of the ARP request packet, and send the discarding flow table entry to the host device, so that the host device may discard a packet of which the source MAC address and the source IP address matches the discarding flow table entry, and then the method is terminated.

In an example, the controlling device may generate and send a discarding flow table entry to a host device, subsequently a virtual device in the host device may control an untrusted ARP request packet and data packet.

In another example, the controlling device may not generate the discarding flow table entry, and may directly discard an untrusted ARP request packet, namely, the virtual device may not reply to the untrusted ARP request packet, and the untrusted packet may be controlled by the controlling device.

At block 205, the controlling device may find a corresponding MAC address in the global port table according to the destination IP address, and respond to the host device with the corresponding MAC address. The method is terminated.

At block 206, the controlling device may respond to the host device with the locally configured global virtual MAC address.

In an example of the present disclosure, only when it is determined that the source IP address and the destination IP address of the ARP request packet do not belong to the same subnet, the global virtual MAC address is used to respond to the host device. In another example, the global virtual MAC address may be used to respond to the host device when it is determined that there is a table entry corresponding to the source MAC address and the source IP address of the ARP request packet in the global port table, regardless of whether the source IP address and the destination IP address belong to the same subnet.

Figure 3:
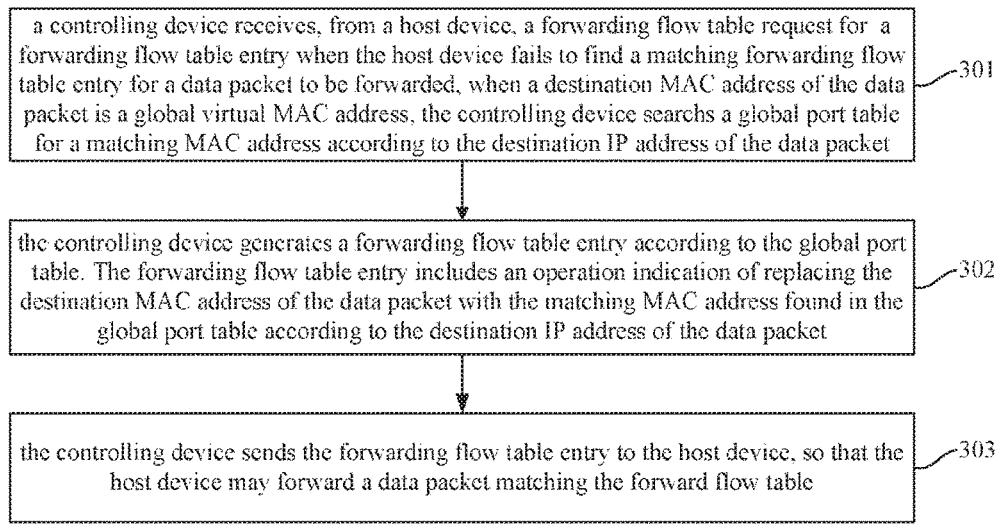
FIG. 3 is a flow diagram illustrating a method for processing a data packet according to an example of the present disclosure.

FIG. 3 is a flow diagram illustrating a method for processing a data packet according to an example of the present disclosure. As show in FIG. 3, the method may include the following processes.

At block 301, a controlling device may receive, from a host device, a forwarding flow table request for a forwarding flow table entry when the host device fails to find a matching forwarding flow table entry for a data packet to be forwarded, when a destination MAC address of the data packet is a global virtual MAC address, the controlling device may search a global port table for a matching MAC address according to the destination IP address of the data packet, namely search the global port table for a MAC address corresponding to the destination IP address of the data packet.

A virtual switch in the host device may receive a data packet sent by a VM, and when failing to find a matching forwarding flow table entry for the data packet, the virtual switch may send a forwarding flow table request for a forwarding flow table entry to the controlling device.

In an example, the forwarding flow table request may be sent in the form of data packet. In another example, the forwarding flow table request may be sent in the form of tuple information of the data packet. For example, the tuple information may include: a destination IP address, a source IP address, a destination MAC address and a source MAC address of the data packet.

At block 302, the controlling device may generate a forwarding flow table entry according to the global port table. The forwarding flow table entry may include an operation indication of replacing the destination MAC address of the data packet with the matching MAC address found in the global port table according to the destination IP address of the data packet.

Matching fields in the forwarding flow table entry may include a virtual port number corresponding to the source MAC address, the source MAC address, the source IP address and the destination IP address.

The operation of the forwarding flow table entry may include: a port number of a output port corresponding to the destination VM, a tunnel IP address corresponding to the destination VM and a VXLAN identifier corresponding to the destination VM, and an operation of replacing the destination MAC address of the data packet with the matching MAC address found in the global port table according to the destination IP address of the data packet.

All of the port number, the tunnel IP address, the matching MAC address and the VXLAN identifier, which are corresponding to the destination VM, may be obtained from the global port table. If the global port table does not store the VXLAN identifier, the corresponding VXLAN identifier may be found out according to a corresponding relationship between a subnet identifier and a VXLAN identifier.

The operation instruction of replacing the destination MAC address with the matching MAC address in the forwarding flow table entry, namely, an operation instruction of replacing the global virtual MAC address configured in the example with an actual MAC address of the destination VM, can make the destination VM perform normal processing on received data packet. In the technical solutions provided in the present disclosure, the controlling device replies on behalf to the ARP request packet sent by each VM with a global virtual MAC address, and then replace the global virtual MAC address with the actual MAC address of the destination VM through a forwarding flow table entry. Thus the controlling device achieves the functions of a gateway.

At block 303, the controlling device may send the forwarding flow table entry to the host device, so that the host device may forward a data packet matching the forwarding flow table entry.

The method for sending the forwarding flow table request for the forwarding flow table entry to the controlling device is not limited by examples of the present disclosure, when the forwarding flow table request is sent in the form of a data packet, the matching MAC addresses found from the global port table based on the destination IP address of the data packet is used to replace the destination MAC address of the data packet, and the data packet of which the destination MAC address is replaced by the matching MAC address is sent to the host device, so that the host device may forward the data packet.

When the forwarding flow table request is sent in the form of tuple information, a forwarding flow table entry is sent to the host device according to the tuple information and the global port table, when forwarding the data packet according to the forwarding flow table entry, the host device needs to replace the destination MAC address of the data packet first according to an operation instruction in the forwarding flow table entry.

Above mentioned two methods for sending the forwarding flow table request to the controlling device do not affect the implementation of the present disclosure, and the difference between the two methods is that in the former method, the replacement of the destination MAC address of the data packet is performed on the controlling device, and in the latter method, the replacement of the destination MAC address of the data packet is performed on the host device.

When the controlling device receives a data packet, and the destination MAC address of the data packet is an actual MAC address corresponding to the destination IP address of the data packet rather than the locally configured global virtual MAC address, the controlling device sends a forwarding flow table entry for the data packet according to a global port table, and sends the data packet to the host device, so that the host device may forward the data packet according to the corresponding forwarding flow table entry.

The communications between the VMs will be described in detail with the accompanying figures.

The communications between VMs in different subnets will be described in detail by taking the communications between VM1-1 and VM2-1 shown in FIG. 1 for example.

Figure 4:
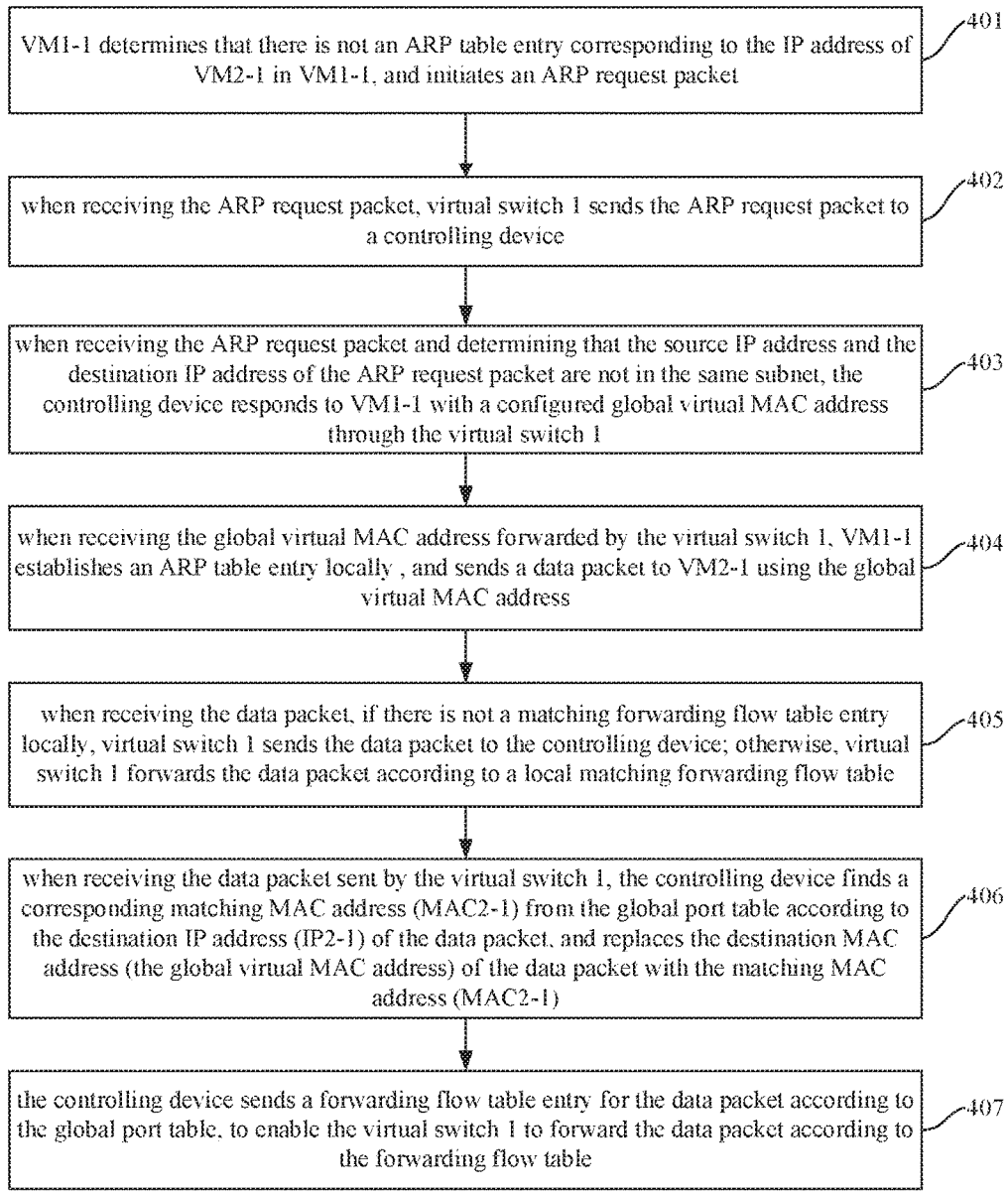
FIG. 4 is a flow diagram illustrating communications between VMs in different subnets according to an example of the present disclosure.

FIG. 4 is a flow diagram illustrating communications between VMs in different subnets according to an example of the present disclosure. As show in FIG. 4, the method may include the following processes.

At block 401, VM1-1 determines that there is not an ARP table entry corresponding to the IP address of VM2-1 in VM1-1, and initiates an ARP request packet.

Since the IP address of VM1-1 and the IP address of VM2-1 are not in the same network segment, the destination IP address of the ARP request packet is the locally configured gateway IP address.

At block 402, when receiving the ARP request packet, virtual switch 1 sends the ARP request packet to a controlling device.

At block 403, when receiving the ARP request packet and determining that the source IP address and the destination IP address of the ARP request packet are not in the same subnet, the controlling device responds to VM1-1 with a configured global virtual MAC address through the virtual switch 1.

When replying to the ARP request packet on behalf, the controlling device may search the global port table in the controlling device to make a judgement about the source IP address and the source MAC address of the ARP request packet. When there is not a table entry corresponding to the source IP address and the source MAC address of the ARP request packet in the global port table, the controlling device may send a discarding flow table entry to the virtual switch via the OpenFlow protocol, to enable the virtual switch to perform the discard processing when receiving a packet of which the source IP address and the source MAC address matches the source IP address and the source MAC address of the ARP request packet. The processing may be used to avoid that a source VM sends an attack packet, and the controlling device forwards the attack packet to a destination VM.

At block 404, when receiving the global virtual MAC address forwarded by the virtual switch 1, which is responded to by the controlling device, VM1-1 establishes an ARP table entry locally, and sends a data packet to VM2-1 using the global virtual MAC address.

The destination IP address of the data packet is the IP address of VM2-1, and the destination MAC address of the data packet is the global virtual MAC address.

At block 405, when receiving the data packet, if there is not a matching forwarding flow table entry locally, virtual switch 1 may send the data packet to the controlling device; otherwise, virtual switch 1 may forward the data packet according to a local matching forwarding flow table entry.

When a VM on the host device initiates communications, if the virtual switch connected with the VM cannot find a matching forwarding flow table entry according to a data packet sent by the VM, the virtual switch may send the data packet sent by the VM or header information of the data packet to the controlling device through a secure channel (such as OpenFlow secure channel). In an example, the virtual switch sends the data packet sent by the VM to the controlling device.

At block 406, when receiving the data packet sent by the virtual switch 1, the controlling device finds a corresponding matching MAC address (MAC2-1) from the global port table according to the destination IP address (IP2-1) of the data packet, and replaces the destination MAC address (the global virtual MAC address) of the data packet with the matching MAC address (MAC2-1).

At block 407, the controlling device sends a forwarding flow table entry for the data packet according to the global port table, to enable the virtual switch 1 to forward the data packet according to the forwarding flow table entry.

Matching fields in the forwarding flow table entry may include port 1-1, the source MAC address (MAC1-1), the source IP address (IP1-1) and the destination IP address (IP2-1).

The operation of the forwarding flow table entry may include an operation of replacing the destination MAC address (the global virtual MAC address G-MAC) with the MAC address (MAC2-1) of VM2-1, port number port 2-1 of the output port, tunnel IP address TIP2 and VXLAN identifier VXLAN 2.

All of the MAC2-1, port 2-1, TIP2 may be obtained from the global port table according to the destination IP address of the data packet, and a corresponding subnet identifier may be obtained, then the corresponding VXLAN may be determined according to a corresponding relationship between the subnet identifier and a VXLAN identifier.

The communications between VMs in the same subnet will be described in detail by taking the communications between VM1-1 and VM1-2 shown in FIG. 1 for example.

In an example, the communicating process between VM1-1 and VM1-2 may be similar to that between VM1-1 and VM2-1 mentioned above. That is to say, when the controlling device receives an ARP request packet, as long as there is a table entry corresponding to the source IP address and the source MAC address of the ARP request packet in the global port table, namely the ARP request packet is a trusted packet, regardless of whether the source IP address and the destination IP address of the ARP request packet belong to the same subnet, the controlling device will respond to the ARP request packet with the global virtual MAC address, and the subsequent forwarding process is similar to that mentioned above.

In another example, when determining that the source IP address and the destination IP address of the ARP request packet belong to the same subnet, the controlling device may directly respond to the ARP request packet with the actual MAC address corresponding to the destination IP address for subsequent data forwarding. The method will be described with the following figure.

Figure 5:
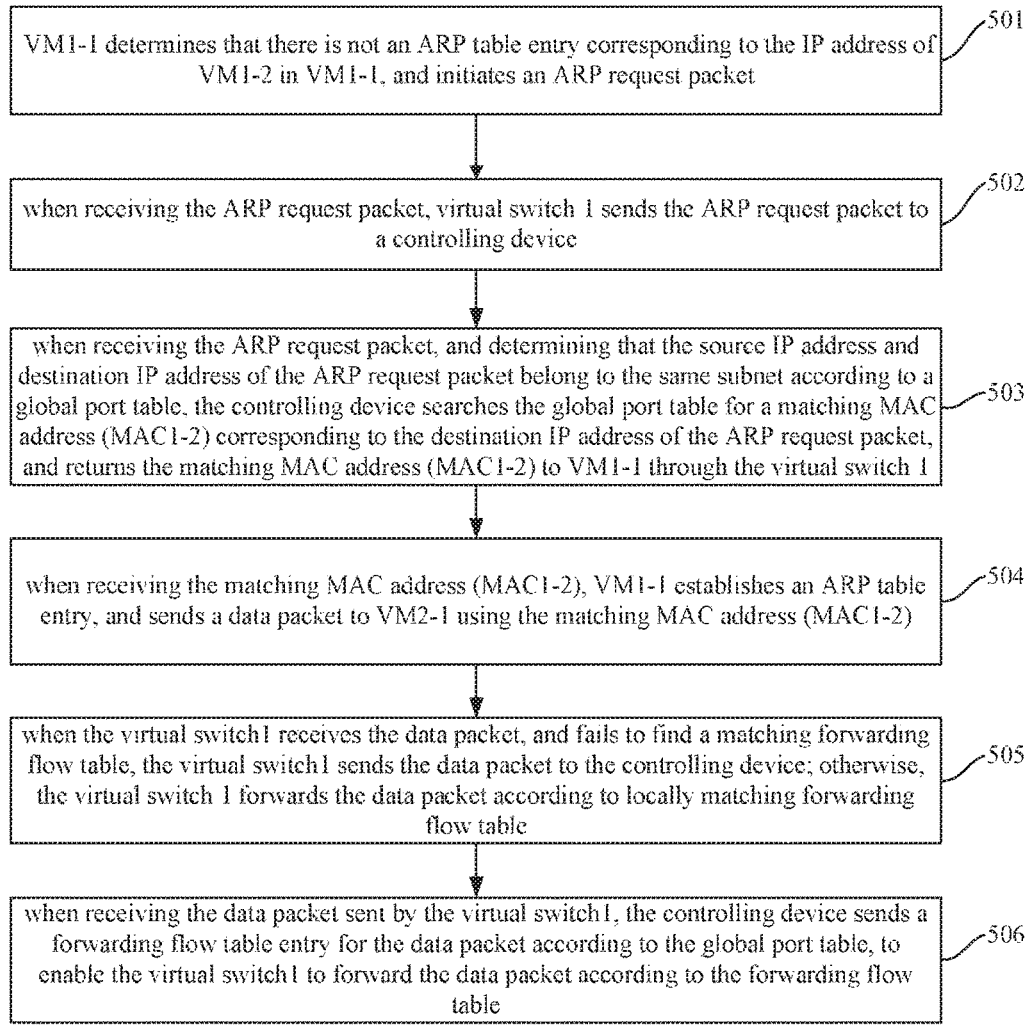
FIG. 5 is a flow diagram illustrating communications between VMs in the same subnet according to an example of the present disclosure.

FIG. 5 is a flow diagram illustrating communications between VMs in the same subnet according to an example of the present disclosure. As show in FIG. 3B, the method may include the following processes.

At block 501, VM1-1 determines that there is not an ARP table entry corresponding to the IP address of VM1-2 in VM1-1, and initiates an ARP request packet.

Since the IP address of VM1-1 and the IP address of VM1-2 are in the same network segment, the destination IP address of the ARP request packet is the IP address of VM1-2.

At block 502, when receiving the ARP request packet, virtual switch 1 sends the ARP request packet to a controlling device.

At block 503, when receiving the ARP request packet, and determining that the source IP address and destination IP address of the ARP request packet belong to the same subnet according to a global port table, the controlling device searches the global port table for a matching MAC address (MAC1-2) corresponding to the destination IP address of the ARP request packet, and returns the matching MAC address (MAC1-2) to VM1-1 through the virtual switch 1.

At block 504, when receiving the matching MAC address (MAC1-2), VM1-1 establishes an ARP table entry, and sends a data packet to VM2-1 using the matching MAC address (MAC1-2).

A destination IP address of the data packet is IP1-2, and a destination MAC address of the data packet is MAC1-2.

At block 505, when the virtual switch1 receives the data packet, and fails to find a matching forwarding flow table entry, the virtual switch1 may send the data packet to the controlling device, otherwise, the virtual switch 1 may forward the data packet according to locally matching forwarding flow table entry.

At block 506, when receiving the data packet sent by the virtual switch1, the controlling device sends a forwarding flow table entry for the data packet according to the global port table, to enable the virtual switch1 to forward the data packet according to the forwarding flow table entry.

Matching fields in the forwarding flow table entry may include port 1-1, the source MAC address MAC1-1, the source IP address IP1-1 and the destination IP address IP1-2.

The operation of the forwarding flow table entry may include: port number port 2-1 of the output port that VM1-2 attached, tunnel IP address TIP2 and VXLAN identifier VXLAN 1.

In above mentioned methods, when performing ARP reply on behalf, the controlling device will not reply on behalf the actual MAC address of the destination VM, but reply on behalf a user configurable global virtual MAC address, such that the source VM can create an ARP table entry and then may perform data communication. Afterwards, when the source VM is performing communications, the global virtual MAC address in the resulting ARP is used as the destination MAC address of the packet. However, the network actually does not have a device corresponding to the global virtual MAC address, and the packet will not arrive at its destination. In the present disclosure, the packet matching field of the packet may be modified. When performing forwarding, the actual MAC address of the destination VM is first searched for in a global port table recorded by the controlling device based on the IP address of the destination VM and is added in the destination MAC field of the packet, and the VXLAN ID where the destination VM is located is encapsulated and sent to the destination virtual switch, thereby completing communication. In this way, the VXLAN layer-3 forwarding may be performed on each virtual switch, without a need to be sent to the VXLAN gateway, which reduces the dependency on the VLAN gateway and makes the flow distribution more reasonable.

As shown in FIG. 1, the first data packet may be forwarded according to the global port table and the global virtual MAC address with the assistance of the controlling device, and subsequent packets may be forwarded according to the forwarding flow table entry.

In an example, the controlling device may be a programmable device combining hardware and software.

Figure 6:
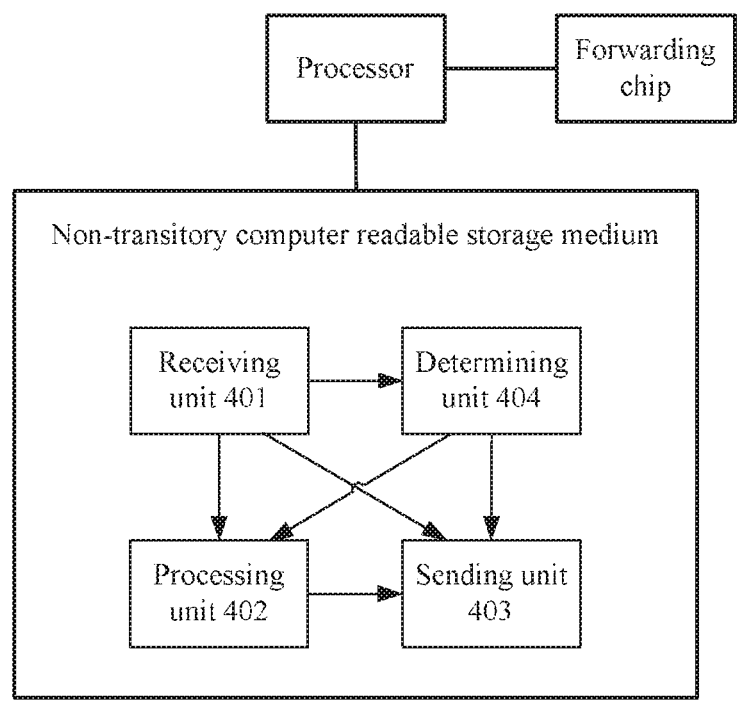
FIG. 6 is a schematic diagram illustrating a hardware structure of a controlling device according to an example of the present disclosure.

FIG. 6 is a schematic diagram illustrating a hardware structure of a controlling device according to an example of the present disclosure. As shown in FIG. 6, the controlling device may include a non-transitory computer readable storage medium 610, a processor 620 and a forwarding chip 630.

The non-transitory computer readable storage medium 610 is configured to store computer executable instructions.

The forwarding chip 630 is connected with the host device through a port on of the forwarding chip, and is configured to send an instruction and a forwarding flow table entry received from the processor 620 to the host device, and send a packet sent by the host device to the processor 620.

The processor 620 is configured to communicate with the forwarding chip 630 to receive or send a packet; and communicate with the non-transitory computer readable storage medium 610 to read and perform the computer executable instructions stored in the non-transitory computer readable storage medium, so as to achieve the processing of the methods shown in FIG. 2 to FIG. 5 including the processing performed on packets sent by the forwarding chip.

In an example, by reading and executing the computer executable instructions, the processor 620 is to perform the following operations.

Receiving an ARP request packet sent by a host device, and responding to the host device with a locally configured global virtual MAC address.

Receiving, from a host device, a forwarding flow table request for a forwarding flow table entry when the host device fails to find a matching forwarding flow table entry for a data packet to be forwarded, when a destination MAC address of the data packet is the global virtual MAC address, searching a global port table for a matching MAC address according to a destination IP address of the data packet, generating a forwarding flow table entry according to the global port table. The forwarding flow table entry may include an operation indication of replacing the destination MAC address of the data packet with the matching MAC address found in the global port table according to the destination IP address of the data packet.

Sending the forwarding flow table entry to the host device, so that the host device may forward a data packet matching the forwarding flow table entry.

In an example, by reading and executing the computer executable instructions, the processor 620 is further to perform the following operations.

When the forwarding flow table request is sent in the form of a data packet, replacing the destination MAC address of the data packet with the matching MAC addresses found from the global port table based on the destination IP address of the data packet, and sending the data packet of which the destination MAC address is replaced by the matching MAC address to the host device, so that the host device may forward the data packet.

In an example, by reading and executing the computer executable instructions, the processor 620 is further to perform the following operations.

When receiving the ARP request packet, determining whether there is a table entry corresponding to a source MAC address and a source IP address of the ARP request packet in a global port table, when there is not a table entry corresponding to the source MAC address and the source IP address of the ARP request packet in the global port table, discarding the ARP request packet, or generating a discarding flow table entry according to the source MAC address and the source IP address of the ARP request packet, and sending the discarding flow table entry to the host device, so that the host device may discard a packet of which the source MAC address and the source IP address matches the discarding flow table entry; when there is a table entry corresponding to the source MAC address and the source IP address of the ARP request packet in the global port table, responding to the host device with the locally configured global virtual MAC address.

In an example, by reading and executing the computer executable instructions, the processor 620 is further to perform the following operations.

When determining that there is a table entry corresponding to the source MAC address and the source IP address of the ARP request packet in the global port table, determining whether the source IP address and a destination IP address of the ARP request packet belong to the same subnet, when the source IP address and the destination IP address of the ARP request packet belong to the same subnet, finding a corresponding MAC address in the global port table according to the destination IP address, and returning a response indicating the corresponding MAC address to the host device, namely responding to the host device with the corresponding MAC address; when the source IP address and the destination IP address of the ARP request packet do not belong to the same subnet, responding to the host device with the locally configured global virtual MAC address.

In an example, by reading and executing the computer executable instructions, the processor 620 is further to perform the following operations.

When the destination MAC address of the data packet is not the global virtual MAC address, generating a forwarding flow table entry according to the global port table, and sending the forwarding flow table entry to the host device, so that the host device may forward the data packet according to the forwarding flow table entry.

In another example, it may be also understood that, the computer executable instructions may include a receiving unit 611, a processing unit 613, a sending unit 612 and a determining unit 614. By reading and executing the computer executable instructions stored in the non-transitory computer readable storage medium 610, the processor 620 may achieve the functions of each above mentioned unit.

In an example, the computer executable instructions may include a receiving unit 611, a sending unit 612 and a processing unit 613.

The receiving unit 611 is configured to receive an ARP request packet sent by a host device; receive, from a host device, a forwarding flow table request for a forwarding flow table entry when the host device fails to find a matching forwarding flow table entry for a data packet to be forwarded.

The sending unit 612 is configured to respond to the host device with a locally configured global virtual MAC address when the receiving unit 611 receives the ARP request packet sent by a host device; send a forwarding flow table entry generated by the processing unit 613 to the host device, so that the host device may forward a data packet matching the forwarding flow table.

The processing unit 613 is configured to search a global port table for a matching MAC address according to a destination IP address of the data packet when the receiving unit 611 receives the forwarding flow table request and when a destination MAC address of the data packet is the global virtual MAC address, and generate the forwarding flow table entry according to the global port table. The forwarding flow table entry may include an operation indication of replacing the destination MAC address of the data packet with the matching MAC address found in the global port table according to the destination IP address of the data packet.

In an example, the processing unit 613 may be further configured to, when the forwarding flow table request is sent in the form of a data packet, replace the destination MAC address of the data packet with the matching MAC addresses found from the global port table based on the destination IP address of the data packet. Correspondingly, the sending unit 612 may further send the data packet of which the destination MAC address is replaced by the matching MAC address to the host device, so that the host device may forward the data packet.

In another example, the computer executable instructions may further include a determining unit 614. The determining unit 614 is configured to determine whether there is a table entry corresponding to a source MAC address and a source IP address of the ARP request packet in a global port table when the receiving unit 611 receives the ARP request packet. Correspondingly, the processing unit 613 may further generate a discarding flow table entry according to the source MAC address and the source IP address of the ARP request packet when the determining unit 614 determines that there is not a table entry corresponding to the source MAC address and the source IP address of the ARP request packet in the global port table. Correspondingly, the sending unit 612 may further send the discarding flow table entry generated by the processing unit 613 to the host device, so that the host device may discard a packet of which the source MAC address and the source IP address matches the discarding flow table entry, respond to the host device with the locally configured global virtual MAC address when the determining unit 614 determines that there is a table entry corresponding to the source MAC address and the source IP address of the ARP request packet in the global port table.

In an example, the determining unit 614 may further determine whether the source IP address and a destination IP address of the ARP request packet belong to the same subnet when determining that there is a table entry corresponding to the source MAC address and the source IP address of the ARP request packet in the global port table. Correspondingly, the processing unit 613 may further search for a corresponding MAC address in the global port table according to the destination IP address when the determining 614 determines that the source IP address and a destination IP address of the ARP request packet belong to the same subnet; the sending unit 612 may further respond to the host device with the corresponding MAC address found by the processing unit 613 from the global port table; and respond to the host device with the locally configured global virtual MAC address when the determining 614 determines that the source IP address and a destination IP address of the ARP request packet do not belong to the same subnet.

In an example, the processing unit 613 may further generate a forwarding flow table entry according to the global port table when the destination MAC address of the data packet is not the global virtual MAC address. The sending unit 612 may further send the forwarding flow table entry to the host device, so that the host device may forward the data packet according to the forwarding flow table entry.

A device for processing a packet may be achieved when a processor reads the computer executable instructions stored in the non-transitory computer readable storage medium into a memory and executes the computer executable instructions in the memory. The device for processing a packet is a logic device, and may perform corresponding operations similar to above mentioned methods.

In the present disclosure, no VXLAN gateway is used in the SDN. When a packet needs to be forwarded between different VXLANs, the controlling device responds to the host device with a configured global virtual MAC address for sending the packet. When receiving a packet of which the destination MAC address is the global virtual MAC address, the controlling device replaces the global virtual MAC address with an actual MAC address, and sends a corresponding forwarding flow table entry to the host device to enable the host device to forward the packet to the destination host device. Thus the distributed routing may be achieved without the VXLAN gateway, the VXLAN gateway will not be a forwarding bottleneck.

In each example of the present disclosure, the controlling device reply to the ARP request packet of each virtual switch on behalf, which avoids the flooding of ARP request packets in network, and reduces the network overload.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The units, if mentioned in the aforesaid examples, may be combined into one unit or further divided into a plurality of sub-units. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for processing a packet in a Software Defined Network (SDN), comprising:
    receiving an address resolution protocol (ARP) request packet sent by a host device, and responding to the host device with a locally configured global virtual Media Access Control (MAC) address;
    determining whether there is a table entry corresponding to a source MAC address and a source Internet Protocol (IP) address of the ARP request packet in a global port table;
    when there is a table entry corresponding to the source MAC address and the source IP address of the ARP request packet in the global port table, responding to the host device with the locally configured global virtual MAC address;
    when there is not a table entry corresponding to the source MAC address and the source IP address of the ARP request packet in the global port table, performing one or more of:
    discarding the ARP request packet; and
    generating a discarding flow table entry according to the source MAC address and the source IP address of the ARP request packet, and sending the discarding flow table entry to the host device, so that the host device discards a packet of which the source MAC address and the source IP address matches the discarding flow table entry;
    receiving, from a host device, a forwarding flow table request for a forwarding flow table entry when the host device fails to find a matching forwarding flow table entry for a data packet to be forwarded:
    when a destination MAC address of the data packet is the global virtual MAC address, searching a global port table for a matching MAC address according to a destination IP address of the data packet;
    generating a forwarding flow table entry according to the global port table, the forwarding flow table entry including an indicator that the destination MAC address of the data packet has been replaced with the matching MAC address found in the global port table; and
    sending the forwarding flow table entry to the host device, so that the host device forwards a data packet matching the forwarding flow table entry.

2. The method according to claim 1, when the forwarding flow table request is sent in the form of a data packet, the method further comprises:
    replacing the destination MAC address of the data packet with the matching MAC addresses found in the global port table, and sending the data packet of which the destination MAC address is replaced by the matching MAC address to the host device, so that the host device forwards the data packet.

3. The method according to claim 1, when determining that there is a table entry corresponding to the source MAC address and the source IP address of the ARP request packet in the global port table, the method further comprises:
    determining whether the source IP address and a destination IP address of the ARP request packet belong to the same subnet, when the source IP address and the destination IP address of the ARP request packet belong to the same subnet, finding a corresponding MAC address in the global port table according to the destination IP address, and responding to the host device with the corresponding MAC address; when the source IP address and the destination IP address of the ARP request packet do not belong to the same subnet, responding to the host device with the locally configured global virtual MAC address.

4. The method according to claim 1, further comprising:
    when the destination MAC address of the data packet is not the global virtual MAC address, generating a forwarding flow table entry according to the global port table, and sending the forwarding flow table entry to the host device, so that the host device forwards the data packet according to the forwarding flow table entry.

5. A controlling device, comprising: a processor, a non-transitory computer readable storage medium in communication with the processor, the non-transitory computer readable storage medium storing instructions executable by the processor to:
    receive an address resolution protocol (ARP) request packet sent by a host device, and respond to the host device with a locally configured global virtual Media Access Control (MAC) address;
    determine whether there is a table entry corresponding to a source MAC address and a source Internet Protocol (IP) address of the ARP request packet in a global port table;
    when there is a table entry corresponding to the source MAC address and the source IP address of the ARP request packet in the global port table, respond to the host device with the locally configured global virtual MAC address;

when there is not a table entry corresponding to the source MAC address and the source IP address of the ARP request packet in the global port table, perform one or more of:

discarding the ARP request packet; and generating a discarding flow table entry according to the source MAC address and the source IP address of the ARP request packet, and sending the discarding flow table entry to the host device, so that the host device discards a packet of which the source MAC address and the source IP address matches the discarding flow table entry;

receive, from a host device, a forwarding flow table request for a forwarding flow table entry when the host device fails to find a matching forwarding flow table entry for a data packet to be forwarded;

when a destination MAC address of the data packet is the global virtual MAC address, search a global port table for a matching MAC address according to a destination IP address of the data packet;

generate a forwarding flow table entry according to the global port table, the forwarding flow table entry including an indicator that the destination MAC address of the data packet has been replaced with the matching MAC address found in the global port table; and send the forwarding flow table entry to the host device, so that the host device forwards a data packet matching the forwarding flow table entry.

6. The controlling device according to claim 5, wherein the instructions further comprise instructions to:

when the forwarding flow table request is sent in the form of a data packet, replace the destination MAC address of the data packet with the matching MAC addresses found in the global port table, and send the data packet of which the destination MAC address is replaced by the matching MAC address to the host device, so that the host device forwards the data packet.

7. The controlling device according to claim 5, wherein the instructions further comprise instructions to:

when determining that there is a table entry corresponding to the source MAC address and the source IP address of the ARP request packet in the global port table, determine whether the source IP address and a destination IP address of the ARP request packet belong to the same subnet, when the source IP address and the destination IP address of the ARP request packet belong to the same subnet, find a corresponding MAC address in the global port table according to the destination IP address, and respond to the host device with the corresponding MAC address; when the source IP address and the destination IP address of the ARP request packet do not belong to the same subnet, respond to the host device with the locally configured global virtual MAC address.

8. The controlling device according to claim 5, wherein the instructions further comprise instructions to:

when the destination MAC address of the data packet is not the global virtual MAC address, generate a forwarding flow table entry according to the global port table, and send the forwarding flow table entry to the host device, so that the host device forwards the data packet according to the forwarding flow table entry.

9. A non-transitory computer readable storage medium, storing machine readable instructions executable by a processor to:

receive an address resolution protocol (ARP) request packet sent by a host device, and respond to the host device with a locally configured global virtual Media Access Control (MAC) address;

determine whether there is a table entry corresponding to a source MAC address and a source Internet Protocol (IP) address of the ARP request packet in a global port table;

when there is a table entry corresponding to the source MAC address and the source IP address of the ARP request packet in the global port table, respond to the host device with the locally configured global virtual MAC address;

when there is not a table entry corresponding to the source MAC address and the source IP address of the ARP request packet in the global port table, perform one or more of:

discarding the ARP request packet; and generating a discarding flow table entry according to the source MAC address and the source IP address of the ARP request packet, and sending the discarding flow table entry to the host device so that the host device discards a packet of which the source MAC address and the source IP address matches the discarding flow table entry;

receive, from a host device, a forwarding flow table request for a forwarding flow table entry when the host device fails to find a matching forwarding flow table entry for a data packet to be forwarded;

when a destination MAC address of the data packet is the global virtual MAC address, search a global port table for a matching MAC address according to a destination IP address of the data packet;

generate a forwarding flow table entry according to the global port table, the forwarding flow table entry including an indicator that the destination MAC address of the data packet has been replaced with the matching MAC address found in the global port table; and send the forwarding flow table entry to the host device, so that the host device forwards a data packet matching the forwarding flow table entry.

10. The non-transitory computer readable storage medium according to claim 9, when the forwarding flow table request is sent in the form of a data packet, wherein machine readable instructions executable by the processor are further to:

replace the destination MAC address of the data packet with the matching MAC addresses found in the global port table, and send the data packet of which the destination MAC address is replaced by the matching MAC address to the host device, so that the host device forwards the data packet.

11. The non-transitory computer readable storage medium according to claim 9, when determining that there is a table entry corresponding to the source MAC address and the source IP address of the ARP request packet in the global port table, wherein machine readable instructions executable by the processor are further to:

determine whether the source IP address and a destination IP address of the ARP request packet belong to the same subnet, when the source IP address and the destination IP address of the ARP request packet belong to the same subnet, find a corresponding MAC address in the global port table according to the destination IP address, and respond to the host device with the corresponding MAC address; when the source IP address and the destination IP address of the ARP request packet do not belong to the same subnet, respond to the host device with the locally configured global virtual MAC address.

\* \* \* \* \*